United States Patent
Kamo et al.

(10) Patent No.: US 10,988,835 B2
(45) Date of Patent: Apr. 27, 2021

(54) HARD PARTICLES AND SINTERED SLIDING MEMBER USING THE SAME

(71) Applicant: TOYOTA JIDOSHA KABUSHIKI KAISHA, Toyota (JP)

(72) Inventors: Yuuki Kamo, Okazaki (JP); Takayuki Yamada, Nisshin (JP); Kimihiko Andou, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/925,359

(22) Filed: Jul. 10, 2020

(65) Prior Publication Data

US 2021/0010112 A1    Jan. 14, 2021

(30) Foreign Application Priority Data

Jul. 12, 2019    (JP) .............................. JP2019-130219

(51) Int. Cl.
*C22C 30/00* (2006.01)
*B22F 5/00* (2006.01)
*B22F 9/08* (2006.01)

(52) U.S. Cl.
CPC .............. *C22C 30/00* (2013.01); *B22F 5/008* (2013.01); *B22F 9/082* (2013.01); *B22F 2301/35* (2013.01)

(58) Field of Classification Search
None
See application file for complete search history.

(56) References Cited

U.S. PATENT DOCUMENTS

| | | | |
|---|---|---|---|
| 2004/0194576 A1 | 10/2004 | Ando et al. | |
| 2012/0304821 A1 | 12/2012 | Ando et al. | |
| 2019/0256955 A1* | 8/2019 | Nagase | ................. C22C 1/0433 |

FOREIGN PATENT DOCUMENTS

| | | |
|---|---|---|
| JP | 2002363681 A | 12/2002 |
| JP | 2011190526 A | 9/2011 |

* cited by examiner

*Primary Examiner* — David Sample
*Assistant Examiner* — Elizabeth Collister
(74) *Attorney, Agent, or Firm* — Dickinson Wright PLLC

(57) ABSTRACT

The present disclosure provides hard particles having improved wear resistance and a sintered sliding member using the hard particles. The present disclosure relates to a hard particle consisting of: 1% to 7% by mass of La, 30% to 50% by mass of Mo, 10% to 30% by mass of Ni, 10% by mass or less of Mn, 1.0% by mass or less of C, with the balance being unavoidable impurities and Co, and to a sintered sliding member using the hard particles.

3 Claims, 3 Drawing Sheets

HARD PARTICLES AND SINTERED SLIDING MEMBER USING THE SAME

CROSS REFERENCE TO RELATED APPLICATIONS

The present application claims priority from Japanese patent application JP 2019-130219 filed on Jul. 12, 2019, the entire content of which is hereby incorporated by reference into this application.

BACKGROUND

Technical Field

The present disclosure relates to hard particles, in particular, hard particles appropriate for improving wear resistance of a sintered sliding member, and to a sintered sliding member using the hard particles.

Background Art

In an automobile, sliding members are used for various equipment, such as an engine and a transmission. In such sliding members, a valve seat and a valve guide for an engine are exposed to a severely sliding environment, such as a high temperature and low oxidation environment caused in association with a recent improvement of engine performance, thereby being required to have high wear resistance.

As the sintered sliding members, such as the valve seat and the valve guide, a sintered sliding member in which hard particles excellent in wear resistance are dispersed in an iron-based base material has been widely used from the aspect of wear resistance and manufacturability.

As the hard particles used in the sintered sliding member, for example, JP 2011-190526 A discloses hard particles formed, in % by mass, of Mo: 20 to 40%, C: 0.5 to 1.0%, Ni: 5 to 30%, Mn: 1 to 10%, Cr: 1 to 10%, Co: 5 to 30%, Y: 0.05 to 2%, with the balance being unavoidable impurities and Fe.

JP 2002-363681 A discloses a sintered alloy and a valve seat comprising hard particles. JP 2002-363681 A discloses the sintered alloy and valve seat formed of 4 to 30% by weight of Mo, 0.2 to 3% by weight of C, 1 to 30% by weight of Ni, 0.5 to 10% by weight of Mn, 2 to 40% by weight of Co, with the balance being unavoidable impurities and Fe when the entirety is 100% by weight.

Here, in the sintered sliding member using the hard particles as described above, the hard particles having oxide films on the surfaces ensure avoiding or reducing adhesive wear caused by a metallic contact of the sintered sliding member with a counterpart sliding member on a sliding surface, and therefore, it is considered to exhibit the wear resistance. However, with the sintered sliding member using the conventional hard particles, in the severely sliding environment, such as the high temperature and low oxidation environment caused in association with the improvement of engine performance, the hard particles cannot maintain the oxide films on the surfaces during sliding, and the adhesive wear due to the metallic contact between the sintered sliding member and the counterpart sliding member is sometimes caused.

SUMMARY

As described above, the sintered sliding member that uses the conventional hard particles does not always have sufficient wear resistance in the severely sliding environment, such as the high temperature and low oxidation environment. Accordingly, the present disclosure provides hard particles having improved wear resistance and a sintered sliding member that uses the hard particles.

The inventors, as a result of variously examining means to solve the above described problem, have completed the present disclosure by finding that adding La, and furthermore, making contents of La, Mo, and Ni fall within specific ranges improve the wear resistance of the hard particles.

That is, the gist of the disclosure is as fallows.

(1) A hard particle consisting of: 1% to 7% by mass of La, 30% to 50% by mass of Mo, 10% to 30% by mass of Ni, 10% by mass or less of Mn, 1.0% by mass or less of C, with the balance being unavoidable impurities and Co.

(2) A sintered sliding member comprising: an iron-based base material; and the hard particles according to the (1) dispersed in the iron-based base material.

(3) The sintered sliding member according to the (2), wherein the sintered sliding member is a valve seat or a valve guide.

The present disclosure ensures providing hard particles having improved wear resistance, and a sintered sliding member using the hard particles.

DETAILED DESCRIPTION

Figure 1:
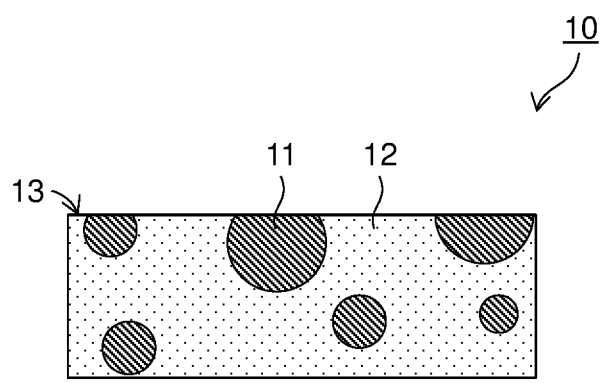
FIG. 1 is a cross-sectional schematic diagram illustrating one embodiment of a sintered sliding member of the present disclosure.

The following describes some embodiments according to the present disclosure in details.

A hard particle of the present disclosure is consisting of: 1% to 7% by mass of La, 30% to 50% by mass of Mo, 10% to 30% by mass of Ni, 10% by mass or less of Mn, 1.0% by mass or less of C, with the balance being unavoidable impurities and Co. The hard particles of the present disclosure having the above-mentioned composition, in particular, the hard particles comprising La and having the contents of La, Mo, and Ni falling within the above-mentioned ranges, while ensuring heat resistance, ensures improved wear resistance (in particular, adhesive wear resistance) due to oxide film forming ability better than that of a conventional way, and also ensures manufacturability. The hard particles of the present disclosure have the high wear resistance, thereby being able to be appropriately used for a sintered sliding member usage.

La included in the hard particles is effective to improve the oxide film forming ability. The present disclosure has found that using La, which has not been used in conventional hard particles for a sintered sliding member, improves the oxide film forming ability of the hard particles, thereby improving the wear resistance.

The content of La in the hard particles is 1% to 7% by mass. When the content of La is 1% by mass or more, sufficient wear resistance improving effect can be obtained, and when it is 7% by mass or less, an excessive oxidation is suppressed and sinterability is also satisfactory. The lower limit of the content of La may be 2% by mass, may be 3% by mass, or may be 4% by mass. The upper limit of the content of La may be 6% by mass, or may be 5% by mass. The content of La may be 1% to 5% by mass.

Mo included in the hard particles is effective to improve the oxide film forming ability as well as improving hardness and wear resistance of the hard particles.

The content of Mo in the hard particles is 30% to 50% by mass. When the content of Mo is 30% by mass or more, the sufficient oxidation is present to improve the oxide film forming ability, and when it is 50% by mass or less, machinability of the sintered sliding member that uses the hard particles is satisfactory. The lower limit of the content of Mo may be 35% by mass, or may be 40% by mass. The upper limit of the content of Mo may be 45% by mass, or may be 40% by mass. The content of Mo may be 30% to 40% by mass.

Ni included in the hard particles increases austenite in the base material of the hard particles, and is effective to improve the wear resistance. Ni in the hard particles is diffused in the base material of the sintered sliding member using the hard particles to increase the austenite in the base material, and is effective to improve the wear resistance.

The content of Ni in the hard particles is 10% to 30% by mass. When the content of Ni is 10% by mass or more, in the sintered sliding member using the hard particles, sinterability between the hard particles and the base material of the sintered sliding member is satisfactory, and when it is 30% by mass or less, hardness of the hard particles is sufficient enough to obtain the high wear resistance. The lower limit of the content of Ni may be 15% by mass, or may be 20% by mass. The upper limit of the content of Ni may be 25% by mass, or may be 20% by mass. The content of Ni may be 20% to 30% by mass.

Mn included in the hard particles is effective to improve contactability between the hard particles and the base material of the sintered sliding member using the hard particles.

The content of Mn in the hard particles is 10% by mass or less. When the content of Mn is 10% by mass or less, the contactability between the hard particles and the base material of the sintered sliding member is sufficiently high and the manufacturability is also satisfactory in the sintered sliding member using the hard particles. The lower limit of the content of Mn may be 0.5% by mass, or may be 1% by mass. The upper limit of the content of Mn may be 5% by mass, or may be 4% by mass. The content of Mn may be 1% to 5% by mass.

C included in the hard particles forms Mo carbide by coupling with Mo and is effective to improve the hardness and the wear resistance of the hard particles.

The content of C in the hard particles is 1.0% by mass or less. When the content of C in the hard particles is 1.0% by mass or less, the machinability of the sintered sliding member using the hard particles is satisfactory. The lower limit of the content of C may be 0.01% by mass, or may be 0.1% by mass. The upper limit of the content of C in the hard particles may be 0.75% by mass, or may be 0.5% by mass. The content of C in the hard particles may be 0.1% to 0.5% by mass.

Co as the balance of the hard particles adds heat resistance and corrosion resistance to the hard particles.

An average particle size of the hard particle is, for example, 1 μm to 500 μm, and may be 25 μm to 250 μm.

The hardness of the hard particle is only necessary to be hard with respect to an object for which the hard particles are used, such as the base material of the sintered sliding member.

The hard particles can be manufactured by, for example, an atomizing process that prepares molten metal having the composition and the content described above, and atomizes this molten metal. In another method, a solidification body of solidified molten metal may be powdered by a mechanical pulverization. While the atomizing process may be any one of a gas atomizing process or a water atomizing process, the gas atomizing process that can obtain round particles is used taking into consideration of the sinterability and the like in some embodiments. The gas atomizing process may be performed in, for example, a non-oxidizing atmosphere (in an inert gas atmosphere, such as a nitrogen gas and an argon gas, or in a vacuum).

The present disclosure also includes a sintered sliding member using the hard particles. The sintered sliding member of the present disclosure is one that comprises the hard particles described above dispersed in an iron-based base material. That is, the sintered sliding member of the present disclosure comprises the iron-based base material and the hard particles described above dispersed in the iron-based base material. FIG. 1 is a cross-sectional schematic diagram illustrating one embodiment of the sintered sliding member of the present disclosure. In a sintered sliding member 10, hard particles 11 are dispersed in an iron-based base material 12, and constitutes a hard phase that enhances the wear resistance of the sintered sliding member 10. In the conventional sintered sliding member, the adhesive wear is caused in some cases due to the metallic contact of the sintered sliding member with the counterpart sliding member by failing to maintain the oxide films of the hard particles on the sliding surface under the severely sliding environment, such as the high temperature and low oxidation environment. On the other hand, the sintered sliding member of the present disclosure uses the hard particles with the high wear resistance (in particular, high adhesive wear resistance) having excellent oxide film forming ability to ensure maintaining the oxide films of the hard particles on the sliding surface, thereby improving the wear resistance.

The iron-based base material is a base material comprising iron (Fe) as a main component. The iron-based base material may comprise carbon (C), or may consist of Fe and C. The content of C in the sintered sliding member is, for example, 5% by mass or less, may be 1.5% by mass or less, or may be 0.7% to 1.5% by mass with respect to the sintered sliding member.

The content of the hard particles in the sintered sliding member is, for example, 1% to 50% by mass, or may be 10% to 50% by mass with respect to the sintered sliding member. When the content of the hard particles is 1% by mass or more, the wear resistance of the sintered sliding member sufficiently increases, and when it is 50% by mass or less, an aggression of the sintered sliding member against the counterpart sliding member sufficiently decreases and holdability of the hard particles is ensured.

The sintered sliding member may comprise other components, such as a sintering additive, such as calcium fluoride, and a lubricant, such as zinc stearate, as necessary. The content of the other components in the sintered sliding member is, usually, 10% by mass or less with respect to the sintered sliding member, or may be 5% by mass or less.

The sintered sliding member is obtained by, for example, mixing powder formed of the hard particles in iron-based powder as the base material such that the hard particles are dispersed, adding powder of the other components as necessary, molding the obtained mixed powder into a molded powder compact, and sintering this molded powder compact.

For the iron-based powder as the base material of the sintered sliding member, for example, pure iron powder and low alloy steel powder can be used. The iron-based powder may comprise carbon powder, or comprises carbon powder in some embodiments. As the carbon powder, for example, graphite powder can be used. As the iron-based powder, the pure iron powder and the graphite powder may be used.

A sintering temperature when the molded powder compact is sintered is, for example, 1000° C. to 1200° C., or may be 1050° C. to 1150° C. A sintering time at the sintering temperature is, for example, 1 minute to 120 minutes, or may be 10 minutes to 60 minutes. A sintering atmosphere may be non-oxidizing atmosphere, such as the inert gas atmosphere, and exemplary non-oxidizing atmospheres include a nitrogen atmosphere, an argon gas atmosphere, and a vacuum atmosphere.

The sintered sliding member of the present disclosure has the high wear resistance, and therefore, the sintered sliding member of the present disclosure can be used in various kinds of sintered sliding members, in particular, is appropriately used for a valve seat and a valve guide of an engine of an automobile and the like.

EXAMPLES

The following describes the present disclosure further in details using examples. However, the technical scope of the present disclosure is not limited to these examples.

Example 1

In the method described below, a valve seat in which hard particles were dispersed in an iron-based base material was manufactured.

Preparation of Hard Particles

Alloy powder was prepared from molten metal having the composition and the content shown in Table 1 by gas atomizing process using nitrogen gas. This was classified into a range of 44 μm to 250 μm and the powder of the hard particles was obtained.

40% by mass of this hard particle powder, 1.0% by mass of graphite powder, 0.8% by mass of zinc stearate powder as a lubricant, with the balance being pure iron powder (reduced powder, a particle size of 44 μm to 250 μm) were mixed in a mixer, and the mixed powder was obtained.

Using a molding die, the mixed powder was subjected to compression molding at molding contact pressure of 784 MPa, and a molded powder compact was formed. The molded powder compact was sintered for 30 minutes at 1100° C. in $N_2$ atmosphere, and the valve seat was manufactured as a test piece for abrasion test.

Examples 2 to 3 and Comparative Examples 1 to 3

The hard particles having the compositions and the contents shown in Table 1 were prepared similarly to Example 1. Using the obtained hard particles, valve seats of Examples 2 to 3 and Comparative Examples 1 to 3 were manufactured similarly to Example 1. In Table 1, contents of the respective components of the hard particles are values when the whole hard particles are 100% by mass, contents of the respective components of the base materials are values when the whole valve seat is 100% by mass, and Bal means the balance.

TABLE 1

| | Hard particle component (% by mass) | | | | | | Hard particle content (% by mass) | Base material (% by mass) | | Abrasion rate |
|---|---|---|---|---|---|---|---|---|---|---|
| | La | Mo | Ni | Mn | C | Co | | C | Fe | |
| Example 1 | 1 | 30 | 20 | 3 | 0.3 | Bal | 40 | 1.0 | Bal | 0.51 |
| Example 2 | 5 | 40 | 20 | 3 | 0.3 | Bal | 40 | 1.0 | Bal | 0.23 |
| Example 3 | 1 | 40 | 30 | 3 | 0.3 | Bal | 40 | 1.0 | Bal | 0.71 |
| Comparative Example 1 | 0 | 40 | 30 | 3 | 0.3 | Bal | 40 | 1.0 | Bal | 1.00 |
| Comparative Example 2 | 1 | 20 | 20 | 3 | 0.3 | Bal | 40 | 1.0 | Bal | 1.71 |
| Comparative Example 3 | 1 | 30 | 35 | 3 | 0.3 | Bal | 40 | 1.0 | Bal | 1.57 |

Figure 2:
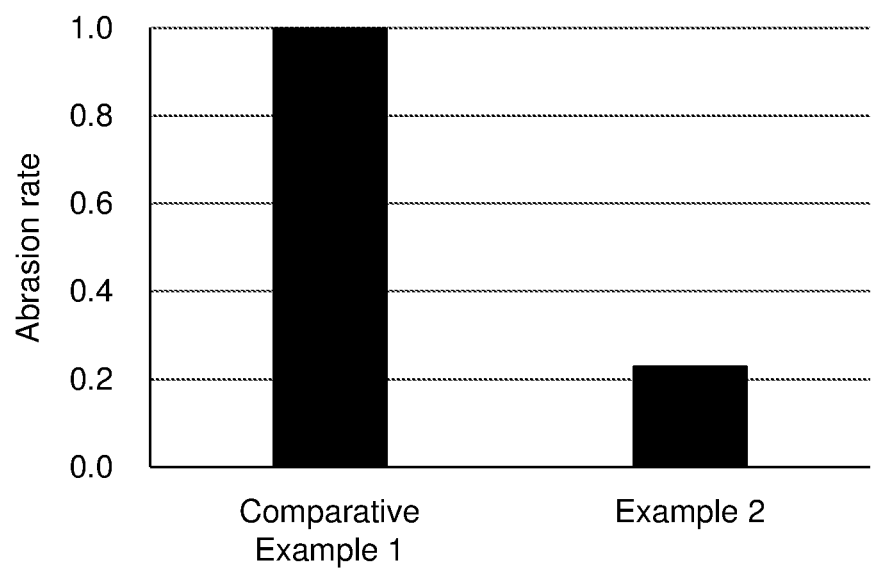
FIG. 2 is a drawing illustrating results of abrasion test of valve seats of Example 2 and Comparative Example 1 according to an example.
Figure 3:
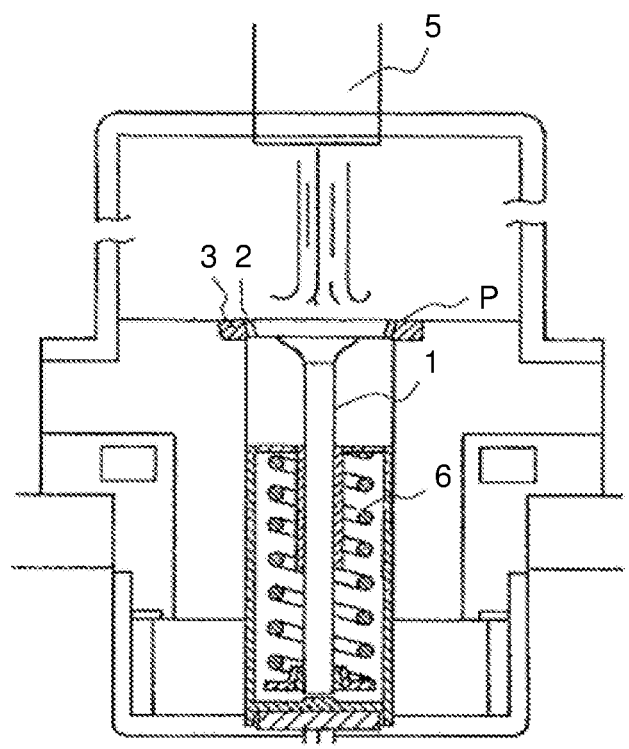
FIG. 3 is a drawing illustrating a device used in the abrasion test according to the example.

Wear resistance of the valve seats of Examples 1 to 3 and Comparative Examples 1 to 3 was measured using a testing device illustrated in FIG. 3. Specifically, a propane gas burner 5 was used as a heating source, and a sliding portion between a valve face 2 and a valve seat 3 was in a propane gas burning atmosphere. A temperature of the valve seat 3 was controlled to 300° C., a spring 6 added a load of 18 kgf when the valve face 2 and the valve seat 3 were in contact, and the valve face 2 and the valve seat 3 were brought into contact at a rate of 2000 times/minute, to perform an 8 hour abrasion test. In this abrasion test, valve sinking amounts from a reference position P were measured. This valve sinking amount corresponds to an abrasion amount (an abrasion depth) of the engine valve 1 and the valve seat 3 abraded by the two being brought into contact. For the valve seats of Examples 1 to 3 and Comparative Examples 1 to 3, rates of the abrasion amount (abrasion rates) with respect to the abrasion amount of the valve seat of Comparative Example 1 were obtained. The abrasion rates of the valve seats of Examples 1 to 3 and Comparative Examples 1 to 3 are shown in Table 1. FIG. 2 shows the results of the abrasion test of the valve seats of Example 2 and Comparative Example 1.

Comparing Example 3 and Comparative Example 1 indicated that using La improves the wear resistance of the valve seat. Comparing Example 1 and Comparative Example 2 indicated that the valve seat of Example 1 using the hard particles in which the content of Mo is within the specific range of the present disclosure improves the wear resistance compared with the valve seat of Comparative Example 2. Comparing Example 1 and Comparative Example 3 indicated that the valve seat of Example 1 using the hard particles in which the content of Ni is within the specific range of the present disclosure improves the wear resistance compared with the valve seat of Comparative Example 3. As described above, it was indicated that using the hard particles using La and having the contents of La, Mo and Ni within the specific ranges of the present disclosure improve the wear resistance of the valve seat.

All publications, patents, and patent applications cited herein are incorporated herein by reference in their entirety.

DESCRIPTION OF SYMBOLS

10: Sintered sliding member
11: Hard particles
12: Iron-based base material
13: Sliding surface
1: Engine valve
2: Valve face
3: Valve seat 5: Propane gas burner
6: Spring
P: Reference position

What is claimed is:

1. A hard particle consisting of: 1% to 7% by mass of La, 30% to 50% by mass of Mo, 10% to 30% by mass of Ni, 10% by mass or less of Mn, 1.0% by mass or less of C, with the balance being unavoidable impurities and Co.

2. A sintered sliding member comprising:
   an iron-based base material; and
   the hard particles according to claim 1 dispersed in the iron-based base material.

3. The sintered sliding member according to claim 2, wherein the sintered sliding member is a valve seat or a valve guide.

* * * * *